(12) United States Patent
Okumura

(10) Patent No.: US 8,651,778 B2
(45) Date of Patent: Feb. 18, 2014

(54) DRILL

(75) Inventor: Takashi Okumura, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 860 days.

(21) Appl. No.: 12/808,650

(22) PCT Filed: Dec. 27, 2008

(86) PCT No.: PCT/JP2008/073873
§ 371 (c)(1),
(2), (4) Date: Aug. 12, 2010

(87) PCT Pub. No.: WO2009/084698
PCT Pub. Date: Jul. 9, 2009

(65) Prior Publication Data
US 2010/0296884 A1  Nov. 25, 2010

(30) Foreign Application Priority Data

Dec. 27, 2007  (JP) ................................ 2007-337237

(51) Int. Cl.
*B23B 51/00*  (2006.01)
*B23P 15/28*  (2006.01)

(52) U.S. Cl.
USPC ........... 408/223; 408/224; 408/227; 408/231; 407/114; 407/115; 407/116

(58) Field of Classification Search
USPC ......... 408/200, 223, 224, 227, 228, 229, 230, 408/231; 407/114, 115, 116
See application file for complete search history.

(56) References Cited

U.S. PATENT DOCUMENTS

| | | | | |
|---|---|---|---|---|
| 3,963,365 A * | 6/1976 | Shallenberger, Jr. | ......... | 408/186 |
| 4,087,192 A * | 5/1978 | Hertel | ............. | 407/114 |
| 4,124,328 A * | 11/1978 | Hopkins | ....... | 408/223 |
| 4,149,821 A * | 4/1979 | Faber | ............. | 408/199 |
| 4,648,760 A * | 3/1987 | Karlsson et al. | ............. | 408/223 |
| 4,681,487 A * | 7/1987 | Pettersson | ............. | 407/114 |
| 5,049,011 A | 9/1991 | Bohnet et al. | | |
| 5,622,461 A * | 4/1997 | Tukala et al. | ............. | 408/224 |
| 5,971,676 A * | 10/1999 | Kojima | ............. | 408/231 |
| 5,993,119 A | 11/1999 | Moller | | |
| 6,039,515 A | 3/2000 | Lamberg | | |
| 6,213,231 B1 | 4/2001 | von Haas | | |
| 6,241,430 B1 * | 6/2001 | Norstrom | ............. | 407/114 |
| 6,527,486 B2 * | 3/2003 | Wiman et al. | ............. | 408/188 |

(Continued)

FOREIGN PATENT DOCUMENTS

EP  0373292 A1  6/1990
EP  0875322 A1  11/1998

(Continued)

OTHER PUBLICATIONS

Extended European search report dated Jan. 17, 2011 for corresponding European application 08867080.7 lists the references above.

*Primary Examiner* — Essama Omgba
(74) *Attorney, Agent, or Firm* — DLA Piper LLP (US)

(57) ABSTRACT

A holder of the present invention has a first insert pocket and a second insert pocket at the tip end thereof. The first insert pocket is located closer to the central axis thereof than the second insert pocket. The axial rake of the first insert pocket is larger than the axial rake of the second insert pocket.

10 Claims, 8 Drawing Sheets

(56) References Cited

U.S. PATENT DOCUMENTS

| | | |
|---|---|---|
| 6,948,891 B2 | 9/2005 | Roman |
| 6,984,094 B2 * | 1/2006 | Nuzzi et al. .................. 408/224 |
| 7,108,460 B2 * | 9/2006 | Chang .......................... 408/223 |
| 7,201,542 B2 * | 4/2007 | Fritsch et al. ................. 408/223 |
| 7,244,081 B2 * | 7/2007 | Johnson et al. ............... 408/224 |
| 7,351,017 B2 * | 4/2008 | Kruszynski et al. .......... 408/223 |
| 7,695,221 B2 * | 4/2010 | Kruszynski et al. .......... 407/113 |
| 7,891,916 B2 * | 2/2011 | Takahashi et al. .............. 407/30 |
| 8,157,489 B2 * | 4/2012 | Wolf et al. ................... 408/223 |
| 8,360,694 B2 * | 1/2013 | Sjoo ................................ 408/24 |
| 8,382,403 B2 * | 2/2013 | Okumura ...................... 408/223 |
| 8,403,604 B2 * | 3/2013 | Sjoo ................................ 408/24 |
| 8,449,226 B2 * | 5/2013 | Nasu et al. .................... 407/114 |
| 8,480,337 B2 * | 7/2013 | Bae ............................... 408/223 |
| 2001/0033779 A1 * | 10/2001 | Wiman et al. ................. 408/188 |
| 2003/0161696 A1 * | 8/2003 | Fritsch et al. ................. 408/223 |
| 2004/0091329 A1 * | 5/2004 | Chang .......................... 408/233 |
| 2004/0124016 A1 * | 7/2004 | Nuzzi et al. ................... 175/426 |
| 2005/0260049 A1 * | 11/2005 | Kruszynski et al. .......... 408/223 |
| 2007/0041798 A1 * | 2/2007 | Nasu et al. .................... 407/114 |
| 2008/0131217 A1 * | 6/2008 | Kruszynski et al. .......... 407/113 |
| 2010/0061821 A1 * | 3/2010 | Okumura ...................... 408/200 |
| 2010/0166514 A1 * | 7/2010 | Okumura ................... 408/1 BD |
| 2010/0272526 A1 * | 10/2010 | Dufour et al. ................. 407/114 |
| 2010/0322732 A1 * | 12/2010 | Mergenthaler et al. ....... 408/229 |
| 2011/0164936 A1 * | 7/2011 | Okumura ................... 408/1 BD |
| 2012/0315099 A1 * | 12/2012 | Sjoo ................................ 408/26 |

FOREIGN PATENT DOCUMENTS

| | | |
|---|---|---|
| EP | 0876867 A1 | 11/1998 |
| EP | 0888841 A2 | 1/1999 |
| EP | 2006042 A2 | 12/2008 |
| JP | 10-180521 | 7/1998 |
| JP | 2001-239412 | 9/2001 |
| JP | 2001-252809 | 9/2001 |
| JP | 2007-260802 | 10/2007 |
| WO | 03099495 A1 | 12/2003 |

* cited by examiner

DRILL

CROSS-REFERENCE TO RELATED APPLICATIONS

This application is a national stage of International Application No. PCT/JP2008/073873 filed on Dec. 27, 2008 and claims the benefit of priority under 35 USC 119 of Japanese Patent Application No. 2007-337237 filed on Dec. 27, 2007, which are incorporated herein by reference.

TECHNICAL FIELD

The present invention relates to a drill having excellent chip discharge performance.

BACKGROUND ART

As a drill for drilling holes, there are for example those in which an inner insert and an outer insert are detachably attached to the tip end of a holder so that their respective rotation loci are partially overlapped with each other. Among others, those in which the inner insert and the outer insert have the same shape are frequently used. That is, the drill in which one type of drill insert (hereinafter referred to as "insert" in some cases) is detachably attached to each of the inner side and the outer side at the tip end of the holder is frequently used.

The inserts used for this drill include an inner cutting edge and an outer cutting edge. The inner cutting edge is the cutting edge for mainly cutting (machining) an inner portion of a bottom face of a hole when it is used as the inner insert. The outer cutting edge is the cutting edge for mainly cutting an outer portion of a bottom face of a hole when it is used as the outer insert.

The insert described in Japanese Unexamined Patent Application Publication No. 10-180521 has the inner cutting edge and the outer cutting edge adjacent to each other which are formed at the intersection portion between the upper face and the side face. An inner breaker groove is formed in a recess shape along the inner cutting edge, and an apex portion is formed along the inner breaker groove. An outer breaker groove is formed in a recess shape along the outer cutting edge, and an apex portion is formed along the outer breaker groove.

One of these inserts and the other are respectively attached as the inner insert and the outer insert to an inner peripheral insert pocket and an outer peripheral insert pocket formed at the tip end portions of a substantially columnar holder. The hole drilling of a work material is carried out with both cutting edges by rotating the holder around the central axis of the holder.

Chips generated during the hole drilling are treated through the inner breaker groove and the outer breaker groove formed in substantially the same shape. However, the rotational speed of the inner cutting edge is different from the rotational speed of the outer cutting edge. Therefore, the chip shape generated by the inner cutting edge and the chip shape generated by the outer cutting edge differ widely from one another.

That is, the chips generated by the inner cutting edge have a spiral shape which is a three-dimensionally complicated shape. The chips generated by the outer cutting edge have a spring-like curled shape. Particularly, when machining a work material having excellent ductility, such as stainless steels or low carbon steels, the chips generated by the outer cutting edge under high rotational speed are hardly curled, so that they are likely to extend without being cut and likely to cling to the holder during the machining. There has been the problem that these chips cannot be smoothly discharged through the inner breaker groove and the outer breaker groove.

DISCLOSURE OF THE INVENTION

An aspect of the present invention is to provide a drill having excellent chip discharge performance.

A holder according to an embodiment of the present invention is one in which a first insert pocket and a second insert pocket to which drill inserts are respectively attached are formed at the tip end side. The first insert pocket is located closer to the central axis than the second insert pocket. The axial rake of the first insert pocket is larger than the axial rake of the second insert pocket.

A drill according to an embodiment of the present invention is one in which a first drill insert having a first cutting edge and a second drill insert having a second cutting edge are respectively attached to the tip end portions of a substantially bar-shaped holder. The holder has at its tip end a first insert pocket to which the first drill insert is attached so that the first cutting edge protrudes from a tip end face of the holder, and a second insert pocket which is located on the outer side than the first insert pocket and to which the second drill insert is attached so that the second cutting edge protrudes from the tip end face of the holder. The axial rake of the first insert pocket is larger than the axial rake of the second insert pocket.

A method of cutting a work material according to an embodiment of the present invention includes the following steps (i) to (iv):

(i) the step of rotating either one of the drill and a work material;

(ii) the step of bringing the first cutting edge and the second cutting edge of the drill closer to the work material;

(iii) the step of cutting the work material by bringing the first cutting edge and the second cutting edge of the drill into contact with the surface of the work material; and (iv) the step of separating the first cutting edge and the second cutting edge from the work material.

In accordance with the drill, the holder, and the cutting method, the chips generated by any one of the first cutting edge (the inner cutting edge) and the second cutting edge (the outer cutting edge) can be smoothly discharged.

PREFERRED EMBODIMENTS FOR CARRYING OUT THE INVENTION

Figure 4:
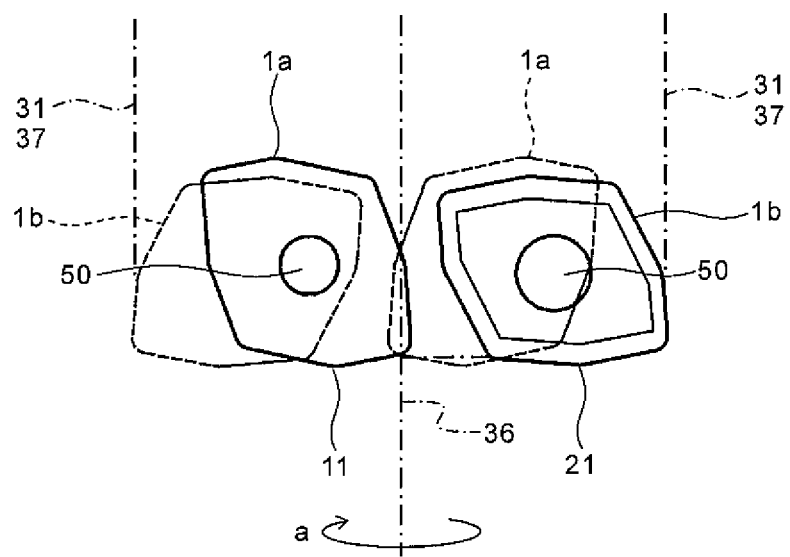
FIG. 4 is a schematic explanatory drawing showing the state of cutting by the drill shown in FIG. 1.
Figure 5:
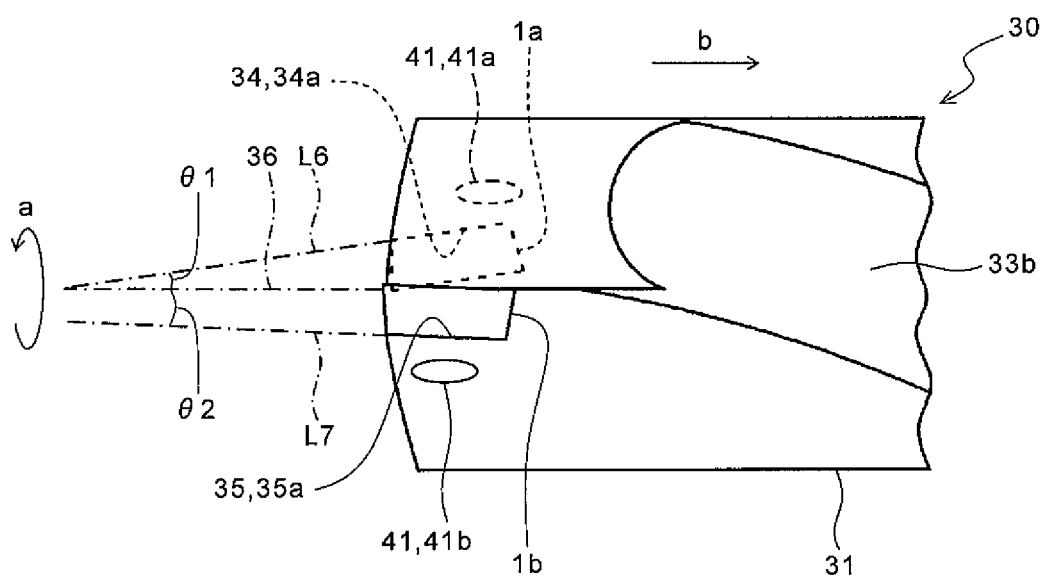
FIG. 5 is a partially enlarged view when the drill shown in FIG. 1 is viewed from the side indicated by the arrow B.
Figure 6:
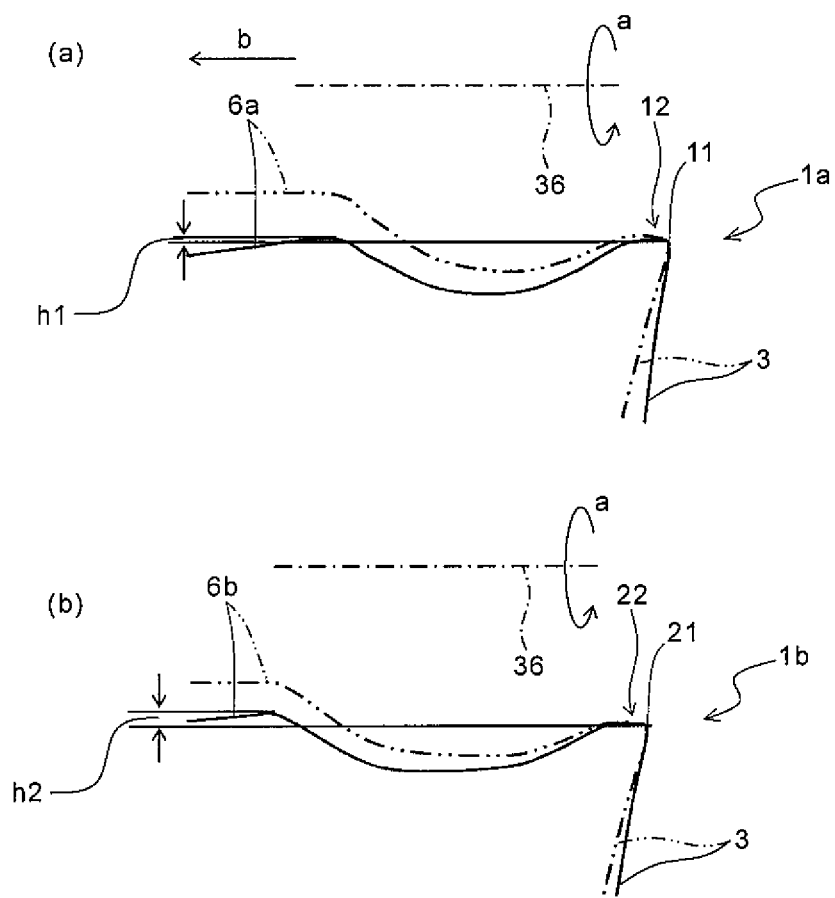
FIG. 6(a) is a schematic explanatory drawing showing the state in which a first drill insert according to the embodiment of the present invention is attached to a first insert pocket.
FIG. 6(b) is a schematic explanatory drawing showing the state in which a second drill insert according to the embodiment of the present invention is attached to a second insert pocket.

An embodiment of the drill according to the present invention is described below in detail with reference to FIGS. 1 to 8. The inserts indicated by the broken lines in FIG. 4 show the states in which the inserts indicated by the solid lines are respectively rotated 180 degrees. The inserts indicated by the dash-double dot lines in FIGS. 6(a) and 6(b) show the states of the insert units before being attached to the insert pockets. Specifically, the inserts indicated by the dash-double dot lines in FIGS. 6(a) and 6(b) show the states in which the lower faces of the inserts are parallel to the central axis of the holder.

Figure 1:
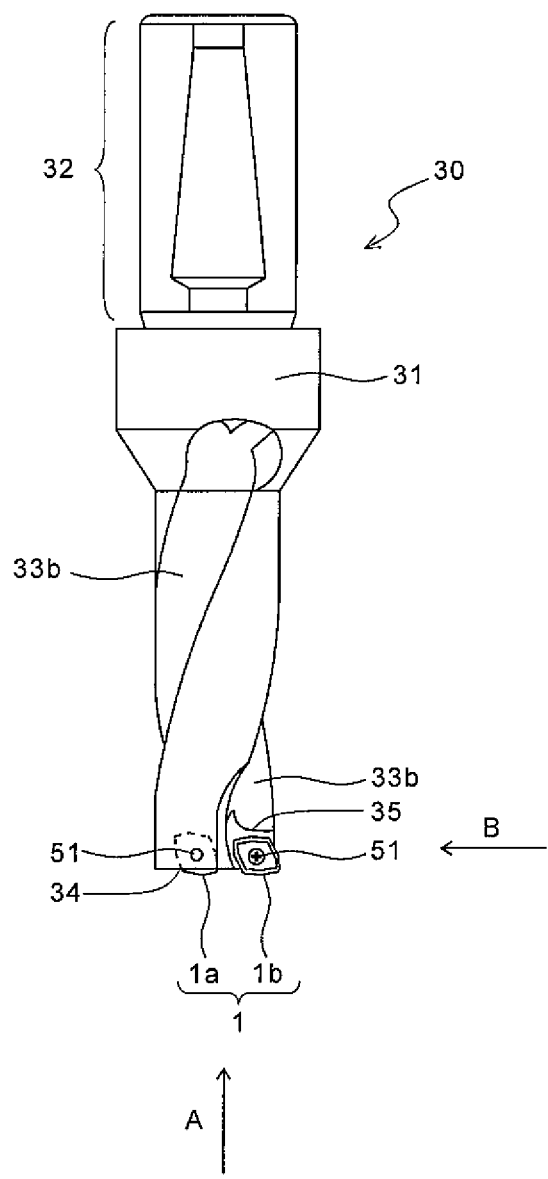
FIG. 1 is a plan view showing a drill according to an embodiment of the present invention.

As shown in FIG. 1, the drill 30 according to the present embodiment is one in which the two inserts 1 are respectively attached to the tip end portions of the holder 31. As shown in FIG. 2(a), each of these inserts 1 has a substantially polygonal plate shape when viewed from above.

These inserts 1 are formed of a sintered body such as cemented carbide, cermet, ceramics, or the like, coated with a film. The film is for improving the wear resistance of the inserts 1. Examples of the composition of the film include titanium based compounds such as titanium carbide, titanium nitride, and titanium carbon nitride, alumina, or the like. The film may be made of at least one layer or alternately, a plurality of layers. The inserts 1 are not limited to these film-coated ones, and those formed of the sintered body without a film coated thereon may be used.

Figure 2:
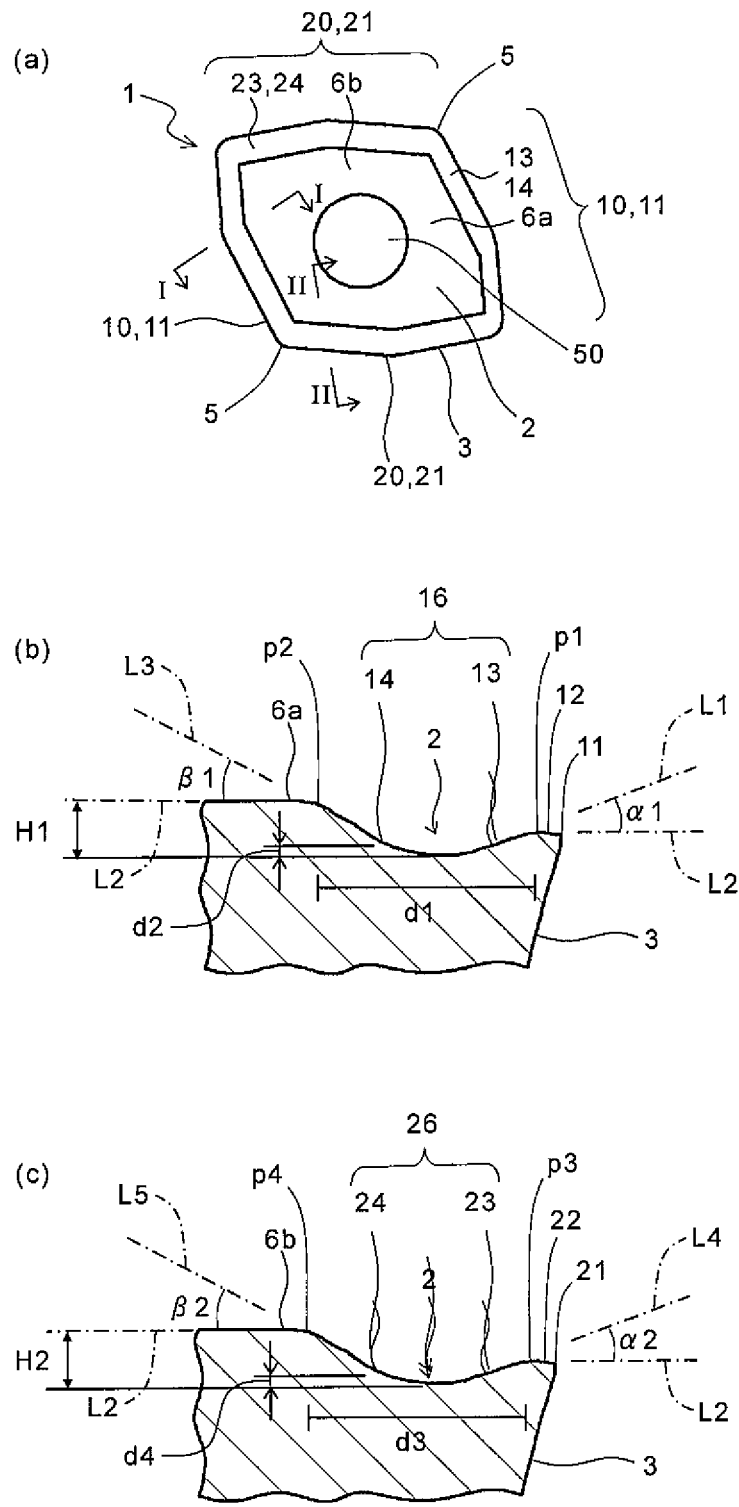
FIG. 2(a) is a plan view showing an insert in the drill shown in FIG. 1.
FIG. 2(b) is an enlarged view showing the cross section taken along the line I-I in FIG. 2(a)
FIG. 2(c) is an enlarged view showing the cross section taken along the line II-II in FIG. 2(a)
Figure 3:
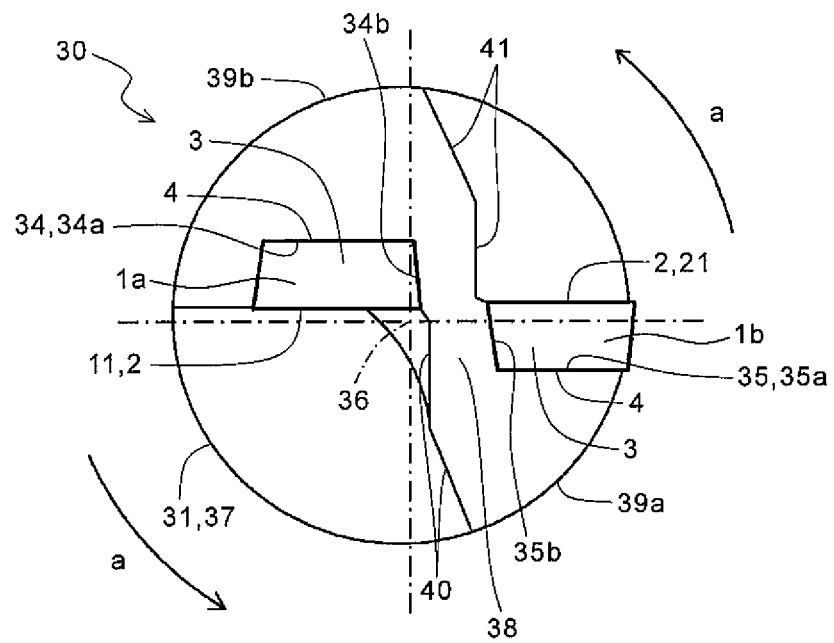
FIG. 3 is an enlarged schematic view when the drill shown in FIG. 1 is viewed from the side indicated by the arrow A.

As shown in FIGS. 2(a) to FIG. 3, each insert 1 has an upper face 2, a lower face 4 corresponding to the upper face 2, and a plurality of side faces 3 located between the upper face 2 and the lower face 4 and connected to the upper face 2 and the lower face 4. As shown in FIG. 2(a), a through hole 50 penetrating through the lower face 4 is formed at a mid-portion of the upper face 2. The through hole 50 is for fixing the insert 1 to later-described insert pockets formed at the tip end portions of the holder 31. The insert 1 has a 180-degree rotational symmetrical shape with respect to the central axis of the through hole 50. It is therefore economical because when one cutting edge in use is worn, the other cutting edge not yet used can be used by rotating the insert 1 180 degrees.

The upper face 2 has a corner part 5, and a first side 10 and a second side 20 extended from both sides of the corner part 5, respectively. Both of the first side 10 and the second side 20 are located at a ridge part of the upper face 2 and continuous with the corner part 5. A first cutting edge 11 (an inner cutting edge) and a second cutting edge 21 (an outer cutting edge) are formed along the first side 10 and the second side 20, respectively.

The first cutting edge 11 is formed at the intersection portion between the upper face 2 and the side face 3 that constitutes a flank face. The first cutting edge 11 is used mainly for cutting an inner portion of a bottom face of a hole when used as the inner insert. As shown in FIG. 2(b), a land face 12, a first rake face 13, a first inclined face 14 and an apex portion 6a are formed in this order from the first cutting edge 11 on the upper face 2. The first rake face 13 and the first inclined face 14 constitute a first breaker groove 16 for curling chips generated by the first cutting edge 11.

The land face 12 is formed along the first cutting edge 11 and adapted to improve the strength of the cutting edge thereby to reduce chipping of the cutting edge. The land face 12 has a predetermined width, and the width is usually approximately 0.05 to 0.15 mm depending on the work material and the cutting conditions.

The first breaker groove 16 is for treating chips and formed in a recess shape along the first cutting edge 11 with the land face 12 interposed therebetween. The first breaker groove 16 has a first rake face 13 and a first inclined face 14 formed in this order from the first cutting edge 11 through the land face 12.

The first rake face 13 is formed along the first cutting edge 11 through the land face 12. The first rake face 13 is the face which the generated chips graze, and is inclined downward at a rake angle $\alpha 1$ to the first cutting edge 11. The first inclined face 14 is inclined at a rise angle $\beta 1$ so as to be at a higher position as it approaches from the first rake face 13 toward the center of the upper face 2 (the through hole 50). That is, the first rake face 13 and the first inclined face 14 are formed to be once lowered from the first cutting edge 11 and then raised toward the center of the upper face 2. The recess-like first breaker groove 16 corresponding to the first cutting edge 11 is formed in the upper face 2 by the first rake face 13 and the first inclined face 14 thus formed.

The rake angle $\alpha 1$ and the rise angle $\beta 1$ may be respectively adjusted to any angle depending on the work material. Although no particular limitation is imposed thereon, usually, the rake angle $\alpha 1$ is approximately 5 to 25 degrees and the rise angle $\beta 1$ is approximately 20 to 45 degrees.

The rake angle $\alpha 1$ can be obtained as an angle formed between a virtual extension line L1 of the first rake face 13 and a line L2 passing through the first cutting edge 11 and being parallel to the lower face 4 in the cross section substantially vertical to the first cutting edge 11. If the first rake face is constituted by a curved face, a virtual line at the intersection between the rake face and the land face 12, or the intersection between the rake face and the first cutting edge 11 is plotted, and an angle formed between the virtual line and the line L2 parallel to the lower face 4 can be obtained as a rake angle.

The rise angle $\beta 1$ can be obtained as an angle formed between a virtual extension line L3 of the first inclined face 14 and the line L2 parallel to the lower face 4. If the first inclined face is constituted by a curved face, the rise angle can be obtained similarly to the case where the first rake face is constituted by the curved face.

The distance d1 between a first cutting edge side end p1 of the first rake face 13 and an apex portion side end p2 of the first inclined face 14 is preferably approximately 1.2 to 2 mm. The distance d1 is so-called breaker width and contributes to chip curling action. As shown in FIG. 2(b), the distance d1 can be measured as a dimension parallel to the lower face 4 in the cross section substantially vertical to the first cutting edge 11. The end p1 is located at the boundary portion between the first rake face 13 and the land face 12. The end p2 is located at the boundary portion between the first inclined face 14 and the apex portion 6a. If the first rake face 13 is formed continuously to the first cutting edge without having the land face 12, the end p1 is located at the boundary portion between the first rake face 13 and the first cutting edge 11.

The distance d2 from the first cutting edge 11 to the lowermost point of the first rake face 13 and the first inclined face 14 is preferably approximately 0.03 to 0.15 mm. The distance d2 is so-called breaker depth and contributes to the chip curling action. As shown in FIG. 2(b), the distance d2 can be measured as the maximum dimension in a direction vertical to the lower face 4 in the cross section substantially vertical to the first cutting edge 11.

The apex portion 6a is disposed at an inward of the first inclined face 14 constituting the first breaker groove 16. Specifically, the apex portion 6a is disposed continuously with an inward portion of the first breaker groove 16. In the present embodiment, the apex portion 6a is located at the mid-portion of the upper face 2 and connected to the mid-portion of the first inclined face 14. The apex portion 6a is formed along the first inclined face 14 and located at a position higher than the first cutting edge 11 in a thickness direction. The apex portion 6a is preferably located at a position that is 0 to 0.3 mm higher than the first cutting edge 11 in the thickness direction. As used herein, the higher position in the thickness direction means the positional relationship in a direction substantially vertical to a flat surface when the lower face 4 is placed on the flat surface. Hereinafter, the description "the higher position in the thickness direction" is defined similarly thereto.

On the other hand, the second cutting edge 21 is formed at the intersection portion between the upper face 2 and the side face 3. The second cutting edge 21 is used mainly for cutting an outer portion of a bottom face of a hole when used as the outer insert. As shown in FIG. 2(c), an outer land face 22, a second rake face 23, a second inclined face 24 and an apex portion 6b are formed in this order from the second cutting edge 21 on the upper face 2. The second rake face 23 and the second inclined face 24 constitute a second breaker groove 26 for curling chips generated by the second cutting edge 21.

The land face 22 is formed along the second cutting edge 21, and the width thereof is usually approximately 0.05 to 0.15 mm.

The second breaker groove 26 is formed in a recess shape along the second cutting edge 21 through the land face 22, and has the second rake face 23 and the second inclined face 24 arranged in this order from the second cutting edge 21 through the land face 22.

The second rake face 23 is formed along the second cutting edge 21 with the land face 12 interposed therebetween. The second rake face 23 is inclined downward at a rake angle $\alpha 2$ to the second cutting edge 21. The second inclined face 24 is inclined at a rise angle $\beta 2$ so as to be at a higher position as it approaches from the second rake face 23 toward the center of the upper face 2. That is, the second rake face 23 and the second inclined face 24 are formed to be once lowered from the second cutting edge 21 and then raised toward the center of the upper face 2. By the second rake face 23 and the second inclined face 24 thus formed, the recess-shaped second breaker groove 26 corresponding to the second cutting edge 21 is formed in the upper face 2.

The rake angle $\alpha 2$ is preferably 5 to 25 degrees, and the rise angle $\beta 2$ is preferably 20 to 45 degrees. Similarly to the rake angle $\alpha 1$, the rake angle $\alpha 2$ can be obtained as an angle formed between a virtual extension line L4 of the second rake face 23 and the line L2 parallel to the lower face 4. Similarly to the rise angle $\beta 1$, the rise angle $\beta 2$ can be obtained as an angle formed between a virtual extension line L5 of the second inclined face 24 and the line L2 parallel to the lower face 4.

The distance d3 between a second cutting edge side end p3 of the second rake face 23 and an apex portion side end p4 of the second inclined face 24 is preferably 1 to 2 mm. The distance d4 from the second cutting edge 21 to the lowermost point of the second rake face 23 and the second inclined face 24 is preferably 0.03 to 0.15 mm. These distances d3 and d4 can be measured similarly to the cases of measuring the distances d1 and d2. Similarly to the distances d1 and d2, the distances d3 and d4 are respectively so-called breaker depth and depth corresponding to the second cutting edge 21.

The apex portion 6b is arranged at an inward of the second inclined face 24 constituting the second breaker groove 26. Specifically, the apex portion 6b is formed continuously with an inward portion of the second breaker groove 26. In the present embodiment, the apex portion 6b is located at the mid-portion of the upper face 2 and connected to the mid-portion of the second inclined face 24. The apex portion 6b is formed along the second inclined face 24 and located at a higher position than the second cutting edge 21 in the thickness direction. The apex portion 6b is preferably located at a position that is 0.15 to 0.4 mm higher than the second cutting edge 21 in the thickness direction. The chips generated by the second cutting edge 21 can be suitably curled and cut by having the second rake face 23, the second inclined face 24 and the apex portion 6b.

The apex portion 6b is formed at substantially the same height as the apex portion 6a with respect to the lower face 4. That is, the apex portion 6a and the apex 6b are substantially on one single plane. Therefore in the present embodiment, no level difference is formed at the boundary portion between the apex portions 6a and 6b.

One of the above-described two inserts 1 and the other are respectively attached as a first drill insert 1a (an inner insert) and a second drill insert 1b (an outer insert) to the tip end portions of the holder 31. Specifically, as shown in FIG. 1, the holder 31 has a substantially cylindrical shape.

A first insert pocket 34 (an inner peripheral insert pocket) and a second insert pocket 35 (an outer peripheral insert pocket) to which the first insert 1a and the second insert 1b are respectively attached are disposed at the tip end portions of the holder 31. The first insert pocket 34 and the second insert pocket 35 are open at a tip end side of the holder 31 in the central axis direction. The radial outside of the second insert pocket 35 is also open.

Figure 7:
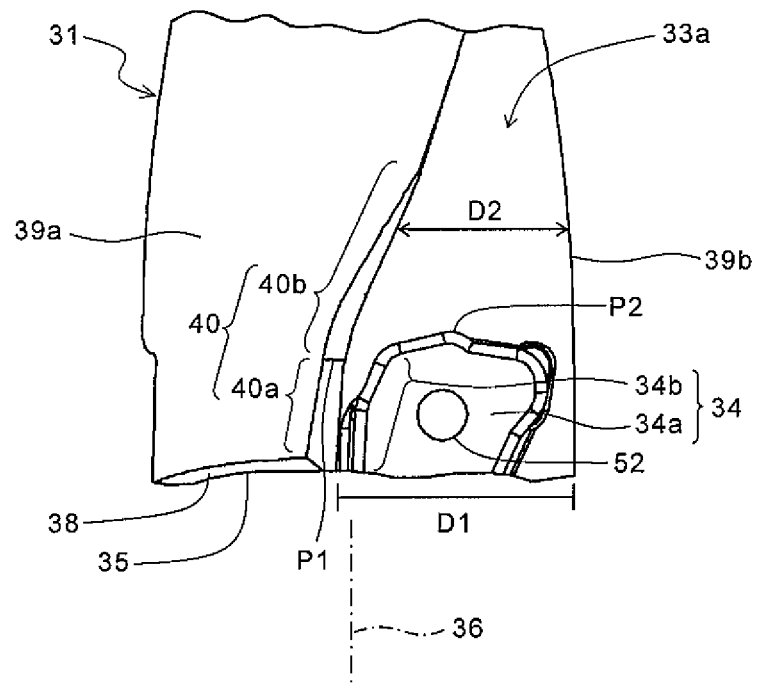
FIG. 7 is a partially enlarged view when the second insert pocket in the drill shown in FIG. 1 is viewed from a direction substantially vertical to a constraining seat face.

The first insert pocket 34 is to have the first insert 1a attached thereto and is formed radially inside (on the central axis side) in the tip end portion of the holder 31. As shown in FIGS. 3 and 7, the first insert pocket 34 has a constraining seat face 34a connected to the lower face 4 of the first insert 1a, and a constraining side face 34b connected to a side face 3 of the first insert 1a. The constraining side face 34b is the portion connected to the side face 3 among the plurality of side faces 3 of the first insert 1a which is adjacent to the central axis 36 while the first insert 1a is attached.

The second insert pocket 35 is to have the second insert 1b attached thereto and is formed at the tip end portion of the holder 31 and radially outside the insert pocket 34 (on the outer side). As shown in FIGS. 3 and 5, the second insert pocket 35 also has a constraining seat face 35a connected to the lower face 4 of the second insert 1b, and a constraining side face 35b connected to the side face 3 of the second insert 1b. The constraining side face 35b is the portion connected to the side face 3 among the plurality of side faces 3 of the second insert 1b which is adjacent to the central axis 36 while the first insert is attached.

The first insert 1a for cutting an inner portion of a bottom face of a hole, and the second insert 1b for cutting an outer portion of a bottom face of a hole are respectively attached to the first insert pocket 34 and the second insert pocket 35 with a different attaching direction each other.

In the attachment operation, firstly, the first insert 1a and the second insert 1b are put in the first insert pocket 34 and the second insert pocket 35, respectively. Hereat, as shown in FIGS. 3 and 4, the first insert 1a and the second insert 1b are set so that the first cutting edge 11 and the second cutting edge 21 protrude from the tip end of the holder 31 in the central axis direction (a tip end face 38 of the holder 31), respectively. Additionally, the rotation loci of the first cutting edge 11 and the second cutting edge 21 at the tip end in the central axis direction are partially overlapped with each other so as to cover from the central axis 36 of the holder 31 to a side face 37.

It is not necessary to have the first cutting edge 11 and the second cutting edge 21 entirely protruded from the tip end of the holder 31. That is, it is enough that at least a part of each cutting edge protrudes from the tip end of the holder 31 depending on the work material and cutting conditions.

As shown in FIG. 1, fastening screws 51 are inserted into the through holes 50 of the first insert 1a and the second insert 1b, respectively, and the tip ends of the fastening screws 51 are screwed into screw holes 52 (refer to FIG. 7) formed in the first insert pocket 34 and the second insert pocket 35, respectively. Thus, the first insert 1a and the second insert 1b are attached to the first insert pocket 34 and the second insert pocket 35, respectively.

The first insert 1a and the second insert 1b attached to their respective insert pockets are arranged so that their respective upper faces 2 face in the same rotational direction (the direction indicated by the arrow "a"). That is, the upper face 2 of the first insert 1a and the upper face 2 of the second insert 1b are 180 degrees opposite from each other. The hole drilling of a work material is carried out with the first cutting edge 11 and the second cutting edge 21 by rotating the holder 31 around the central axis 36 of the holder 31.

Hereat, to curl and cut the chips generated by the second cutting edge 21 under high speed rotation, the apex portion 6b may be formed at a higher position in the insert unit.

However, if the apex portion 6a is located at a high position as the apex portion 6b, the discharge space of the chips generated by the first cutting edge 11 having a three-dimension complicated shape becomes narrow. If the apex portion 6a is located at a position lower than the apex portion 6b in the insert unit in order to maximize the discharge space of the chips generated by the first cutting edge 11, a level difference is formed at the boundary portion between the apex portion 6a and the apex portion 6b, and the chips accumulate in the level difference portion.

In the drill 30 according to the present embodiment, as shown in FIG. 5, an axial rake $\theta 1$ (an axial rake angle) of the first insert pocket 34 is larger than an axial rake $\theta 2$ of the second insert pocket 35. Additionally, in the drill 30 according to the present embodiment, the apex portion 6a along the first cutting edge 11 and the apex portion 6b along the second cutting edge 21 are on one single plane as described above. Hence, when the first insert 1a and the second insert 1b are attached to the first insert pocket 34 and the second insert pocket 35, respectively, as shown in FIGS. 6(a) and 6(b), the apex portion 6a is largely inclined than the apex portion 6b with no level difference at the boundary portion between the apex portion 6a and the apex portion 6b. Accordingly, even if the apex portion 6b, whose height is limited from the design point of view due to the problems of the level difference and the like in the conventional inserts, is located at a higher position in the insert itself with respect to the lower face 4, the apex portion 6a can be located at a lower position with respect to the first cutting edge 11 in the state of being attached to the holder 31.

That is, by including the apex portions 6 (6a and 6b) continuously arranged on the first inclined face 14 and the second inclined face 24, and by making the axial rake $\theta 1$ greater than the axial rake $\theta 2$, the chips generated by the second cutting edge 21 can be suitably curled and cut, and a wider discharge space of the chips generated by the first cutting edge 11 can be ensured. Consequently, the drill 30 is capable of smoothly discharging the chips generated by any one of the first cutting edge 11 and the second cutting edge 21, thereby exhibiting excellent chip discharge performance.

Thus, in the drill 30 according to the present embodiment, as shown in FIGS. 2(a) and 2(c), the distance H1 between the apex portion 6a and the first cutting edge 11 is substantially equal to the distance H2 between the apex portion 6b and the second cutting edge 21 in the direction vertical to the lower face 4. As shown in FIGS. 6(a) and 6(b), the distance h1 between the apex portion 6a and the first cutting edge 11 is smaller than the distance h2 between the apex portion 6b and the second cutting edge 21 in the direction vertical to the central axis 36 of the holder 31.

In other words, in the insert unit (when the insert is placed on a flat surface), the distance between the apex portion 6a and the first cutting edge 11 is approximately equal to the distance between the apex portion 6b and the second cutting edge 21. On the other hand, in the state of being attached to the holder 31, the distance between the apex portion 6a and the first cutting edge 11 is smaller than the distance between the apex portion 6b and the second cutting edge 21.

With this arrangement, the chips having different shapes generated by the first cutting edge 11 and the second cutting edge 21 can be discharged smoothly.

The description that the distance H1 is approximately equal to the distance H2 means to be substantially equal and, for example, a difference of ±0.01 mm may be included therein.

As used herein, the distance H1 between the apex portion 6a and the first cutting edge 11 in the direction vertical to the lower face 4 means specifically a difference between the height of the apex portion 6a to the lower face 4 and the height of the first cutting edge 11 to the lower face 4. As shown in FIGS. 2(a) and 2(c), as used herein, the height of the apex portion 6a to the lower face 4 means the height of the apex portion 6a to the lower face 4 at an outer end of the apex portion 6a, namely, the end of the apex portion 6a on the side thereof on which the first breaker groove 16 is disposed. Similarly, the height of the first cutting edge 11 to the lower face 4 means the height of the first cutting edge 11 to the lower face 4 at the outer end of the first cutting edge 11. The distance H2 between the apex portion 6b and the second cutting edge 21 can be obtained similarly to the distance H1.

As used herein, the distance h1 between the apex portion 6a and the first cutting edge 11 in the direction vertical to the central axis 36 of the holder 31 means specifically a difference between the height of the apex portion 6a to the central axis 36 of the holder 31 and the height of the first cutting edge 11 to the central axis 36 of the holder 31. As shown in FIGS. 6(a) and 6(b), as used herein, the height of the apex portion 6a to the central axis 36 of the holder 31 means the height of the apex portion 6a to the central axis 36 of the holder 31 at an outer end of the apex portion 6a, namely, the end of the apex portion 6a on the side thereof on which the first breaker groove 16 is disposed. Similarly, the height of the first cutting edge 11 to the central axis 36 of the holder 31 means the height of the first cutting edge 11 to the central axis 36 of the holder 31 at the outer end of the first cutting edge 11. The distance H2 between the apex portion 6b and the second cutting edge 21 can be obtained similarly to the distance H1.

Particularly, both of the axial rakes θ1 and θ2 of the drill 30 according to the present embodiment are positive. Thereby, in the state of being attached to the holder 31, the substantial rake angles of the first cutting edge 11 and the second cutting edge 21 can be increased, thus improving cutting performance. Further, when the axial rake θ1 is positive, in the state of being attached to the holder 31, the apex portion 6a is inclined to the rotational direction of the holder 31 (the direction indicated by the arrow "a") so as to be retracted toward the basal end of the holder 31 (in the direction indicated by the arrow "b"). The degree of inclination of the apex portion 6a is larger than that of the apex portion 6b. It is therefore possible to ensure a larger discharge space of the chips generated by the first cutting edge 11.

The axial rake θ1 is preferably 5 to 10 degrees, and the axial rake θ2 is preferably 2 to 7 degrees. Within these numerical ranges, the axial rake θ1 is preferably larger than the axial rake θ2.

As used herein, the axial rake means an angle formed between the virtual extension line of the constraining seat face of the insert pocket and the central axis of the holder, when viewed from the side. Therefore, to make the axial rake θ1 greater than the axial rake θ2, as shown in FIG. 5, it is recommended that the axial rake θ1 formed between a virtual extension line L6 of the constraining seat face 34a of the first insert pocket 34 and the central axis 36 be greater than the axial rake θ2 formed between a virtual extension line L7 of the constraining seat face 35a of the second insert pocket 35 and the central axis 36.

The constraining seat faces 34a and 35a mean the portions of the insert pockets 34 and 35 that are insert attachment parts, respectively, which are brought into contact with the lower face 4 of the insert 1.

On the other hand, in the present embodiment the land faces 12 and 22 in the insert units are inclined to the lower face 4 toward the first cutting edge 11 and the second cutting edge 21, as shown in FIGS. 2(b) and 2(c). That is, the land faces 12 and 22 are inclined to become lower toward the first cutting edge 11 and the second cutting edge 21, respectively. The angle at which the land faces 12 and 22 in the state of being attached to the holder 31 become parallel to the central axis 36 of the holder 31 is employed as the inclination angle. Thereby, as shown in FIGS. 6(a) and 6(b), the land faces 12 and 22 in the state of being attached to the holder 31 become parallel to the central axis 36 of the holder 31, and hence the cutting edge strength can be improved, thereby reducing the cutting edge chipping.

Further, in the state of being attached to the holder 31, the clearance angle of the side face 3 along the first cutting edge 11 is equal to the clearance angle of the side face 3 along the second cutting edge 21. This improves the cutting edge strength of the first cutting edge 11, thereby reducing fracturing.

A shank portion 32 for fixing the holder 31 to a machine tool is formed at the basal end of the holder 31 as shown in FIG. 1. The holder 31 has a first groove 33a (a chip discharge groove) and a second groove 33b (a chip discharge groove). The first groove 33a is adjacent to the first insert pocket 34 and extended helically from the tip end of the holder 31 toward the basal end thereof, as shown in FIG. 7. The second groove 33b is adjacent to the second insert pocket 35 and extended helically from the tip end of the holder 31 toward the basal end thereof (the shank portion 32 side), as shown in FIGS. 1 and 5. Consequently, the chips generated by the first cutting edge 11 and the second cutting edge 21 can be guided into the first groove 33a and the second groove 33b and smoothly conveyed from the tip end of the holder 31 to the tip end thereof and then discharged.

The holder 31 has wall faces 40 and 41, as shown in FIG. 3. The wall face 40 is formed to extend in substantially the same direction as the constraining side face 34b of the first insert pocket 34. The wall face 41 is formed to extend in substantially the same direction as the constraining side face 35b of the second insert pocket 35. The constraining side faces 34b and 35b mean the portions which are intersected with the constraining seat faces 34a and 35a on the central axis side of the holder 31, and are connected to the side face 3 of the insert 1 in the insert pockets 34 and 35, respectively.

In the surroundings of the wall faces 40 and 41, their respective tip ends in the central axis direction of the holder 31 and their respective radial outsides are opened. The wall face 40 is connected to a tip end face 38 of the holder 31 and a second insert pocket side outer peripheral face 39a. The wall face 41 is connected to the tip end face 38 and a first insert pocket side outer peripheral face 39b. That is, the wall faces 40 and 41 are formed so as not to cover the first insert pocket 34 and the second insert pocket 35 each opening in the predetermined direction.

Having the wall faces 40 and 41 ensures that the chips generated by the first cutting edge 11 and the second cutting edge 21 are guided into the first groove 33a and the second groove 33b. In these wall faces 40 and 41, the wall face 40 is formed so that the distance from the wall face 40 to the outer peripheral face 39b on the first insert pocket is longer at the tip end of the holder 31 than the basal end thereof.

That is, D1 and D2 have the following relationship: D1>D2 where D1 is a distance between the wall face 40 and the outer peripheral face 39b on the tip end side of the holder 31; and D2 is a distance between the wall face 40 and the outer peripheral face 39b on the basal end side of the holder 31, when viewed from a direction substantially vertical to the constraining seat face 34a.

Further, the wall face 40 is inclined so as to approach the outer peripheral face 39b from the tip end of the holder 31 toward the basal end thereof, when viewed from the direction substantially vertical to the constraining seat face 34a. The wall face 40 has a first face 40a located at the tip end of the holder 31, and a second face 40b located toward the basal end of the holder 31 than the first face 40a. Both of the first face 40a and the second face 40b are inclined so as to approach the outer peripheral face 39b from the tip end of the holder 31 toward the basal end thereof.

Figure 8:
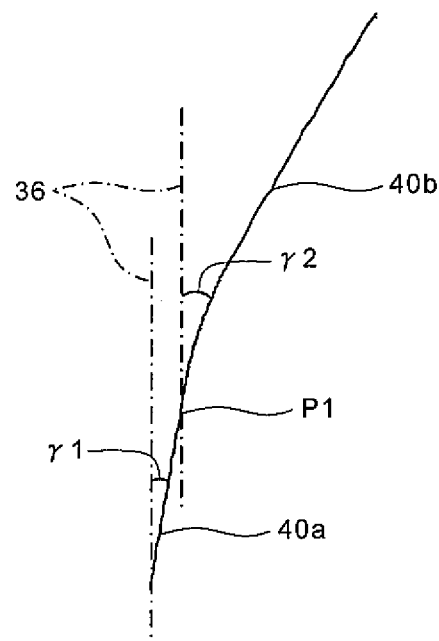
FIG. 8 is a schematic explanatory drawing showing an inclination angle of a wall face to the central axis of the holder in the holder according to the embodiment of the present invention.

As shown in FIG. 8, γ1 and γ2 have the following relationship: γ1<γ2 where γ1 is an inclination angle of the first face 40a to the central axis 36; and γ2 is an inclination angle of the second face 40b to the central axis 36.

Forming the wall face 40 in the specific shape ensures the rigidity of the holder 31. That is, the thickness of the holder 31 is reduced and the rigidity thereof is deteriorated by making the axial rake θ1 greater than the axial rake θ2, and by forming the first groove 33a and the second groove 33b. The rigidity deterioration is large in the vicinity of the first insert pocket 34 having the axial rake θ1. Forming the wall face 40 in the specific shape ensures the thickness in the vicinity of the first insert pocket 34, hence ensuring the rigidity of the holder 31 besides having the excellent chip discharge performance.

As shown in FIG. 7, an intersection portion P1 between the first face 40a and the second face 40b when viewed from the direction substantially vertical to the constraining seat face 34a is located toward the tip end of the holder 31 than an end P2 located toward the basal end of the holder 31 on the constraining seat face 34a. This makes it difficult for the chips generated by the first cutting edge 11 to touch the intersection portion P1 while ensuring the thickness in the vicinity of the first insert pocket 34. It is therefore capable of reducing the fact that the chips touch the intersection portion P1 and the chips are accumulated within the holder 31, besides ensuring the rigidity of the holder 31.

As shown in FIG. 5, the holder 31 has a coolant hole 41 that penetrates from the basal end to the tip end and opens into the outer peripheral face at the tip end. The coolant hole 41 has a first opening 41a located in the vicinity of the first insert pocket 34, and a second opening 41b located in the vicinity of the second insert pocket 35. The first opening 41a is located toward the basal end of the holder 31 than the second opening 41b. Making the first opening 41a and the second opening 41b open in this arrangement can reduce deterioration of the rigidity of the holder 31. Consequently, the excellent chip discharge performance can be exhibited besides maintaining the rigidity of the holder 31.

Figure 9:
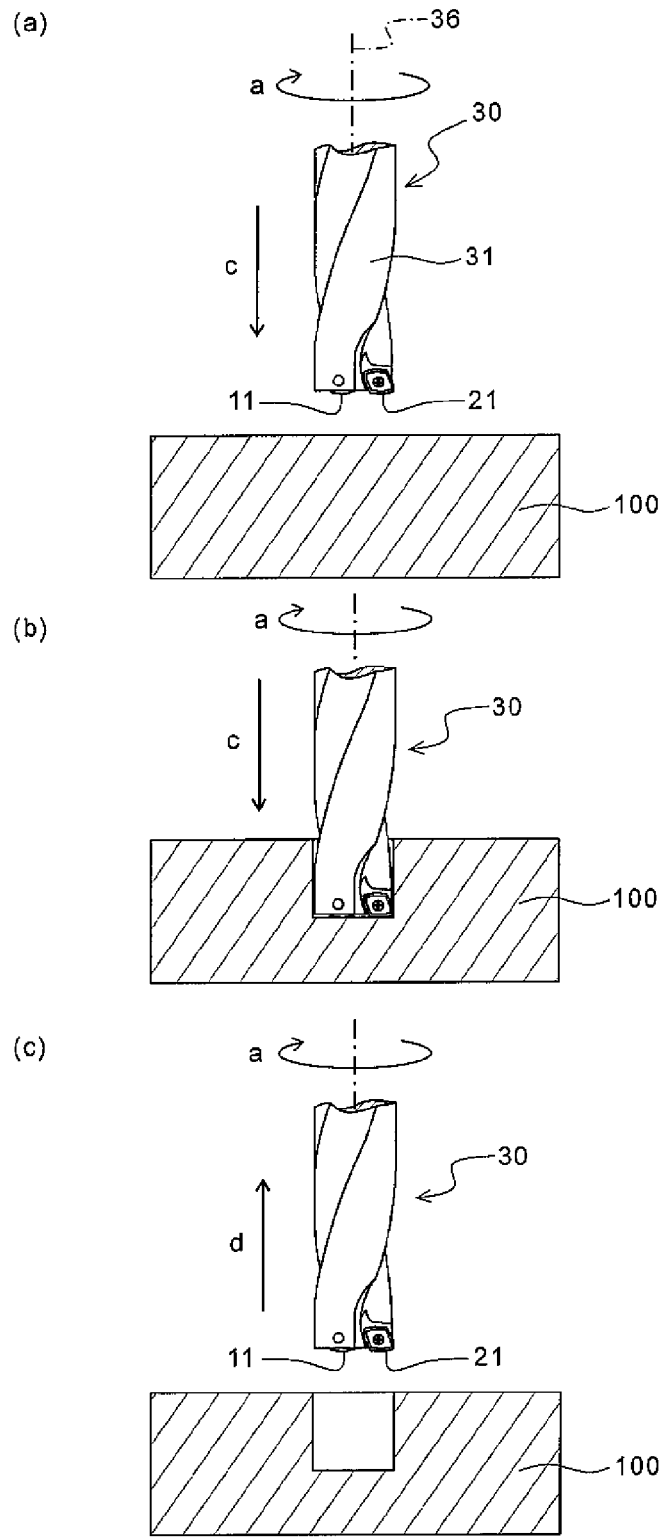
FIGS. 9(a) to 9(c) are schematic explanatory drawings showing a method of cutting a work material according to an embodiment of the present invention.

Next, an embodiment according to the method of cutting a work material in the present invention is described in detail with reference of FIGS. 9(a) to 9(c) by taking, for example, the case of using the drill 30. The method of cutting the work material according to the present embodiment includes the following steps (i) to (iv):

(i) the step of rotating the drill 30 around the central axis 36 of the holder 31 in the direction indicated by the arrow "a" as shown in FIG. 9(a);

(ii) the step of bringing the first cutting edge 11 and the second cutting edge 21 of the drill 30 closer to the work material 100 by moving the drill 30 in the direction indicated by the arrow "c" as shown in FIG. 9(a);

(iii) the step of cutting (hole-drilling) the work material 100 by further moving the drill 30 in the direction indicated by the arrow "c" as shown in FIG. 9(b) so that at least a part of the first cutting edge 11 and at least a part of the second cutting edge 21 of the drill 30 are brought into contact with the surface of the work material 100; and (iv) the step of separating the first cutting edge 11 and the second cutting edge 21 from the work material 100 by moving the drill 30 in the direction indicated by the arrow "d" as shown in FIG. 9(c).

Hereat, the two inserts 1 are attached to the drill 30. Therefore, in the step (iii), the cutting can be carried out while smoothly discharging the chips generated by either one of the first cutting edge 11 and the second cutting edge 21. As a result, excellent machining accuracy can be exhibited, thus producing a satisfactory machined surface on the work material 100 under more severe cutting conditions or high degree of difficulty. Particularly, it is suitable for cutting the work material 100 having excellent ductility, such as a stainless steel or a low carbon steel.

In the step (i), either one of the drill 30 and the work material 100 may be rotated. In the step (ii), each of the cutting edges 11 and 21 and the work material 100 may relatively come closer to each other. For example, the work material 100 may be brought closer to the individual cutting edges 11 and 21. Similarly, in the step (iv), the work material 100 and the individual cutting edges 11 and 21 may be relatively separated. For example, the work material 100 may be separated from the individual cutting edges 11 and 21. When the cutting (machining) is continued, the step of bringing the individual cutting edges 11 and 21 of the drill 30 into contact with different points of the work material 100 may be repeated, keeping the state in which either one of the drill 30 and the work material 100 is rotated. When the cutting edge in use is worn, the unused cutting edge may be used by rotating the insert 1 180 degrees with respect to the central axis of the through hole 50.

While the preferred embodiments of the present invention have been described and illustrated above, it is to be understood that the present invention is not limited to the foregoing embodiments and various improvements and changes can be made thereto within the scope of claims. For example, although the foregoing embodiment has described the case where both of the axial rakes of the first insert pocket and the second insert pocket are positive, the present invention is not limited thereto. For example, both of the axial rakes of the first insert pocket and the second insert pocket may be negative. Alternatively, the axial rake of the first insert pocket may be positive and the axial rake of the second insert pocket may be negative.

Although the rake face is formed along the cutting edge through the land face, it may be formed continuously to the cutting edge without interposing the land face therebetween. Alternatively, the land face may be formed only one of the inserts.

Although in the foregoing embodiment the shapes of the rake face and the inclined face are formed in the shape whose cross section is curved, they may be for example a shape having a flat bottom face between the rake face and the inclined face. Like a rake face having a two-step rake angle, one in which the rake face is made up of a plurality of faces may also be employed.

Although in the foregoing embodiment the rake face is formed to be inclined downward, the rake face may be formed substantially parallel to the land face. That is, the "rake face" in the present invention includes the arrangement that the rake angle is 0°.

A protruded portion protruding outward from the insert when viewed from above may be formed at one end of the second cutting edge. This improves the bite of the second cutting edge into the work material, thereby reducing the cutting edge fracture. A rounded end portion is preferably formed on both ends of the protruded portion. The rounded end portions mean those in which the angle formed between two lines that are respectively continuous with both sides of a curved portion is nearly a right angle and within the range of 60 to 160 degrees.

Figure 10:
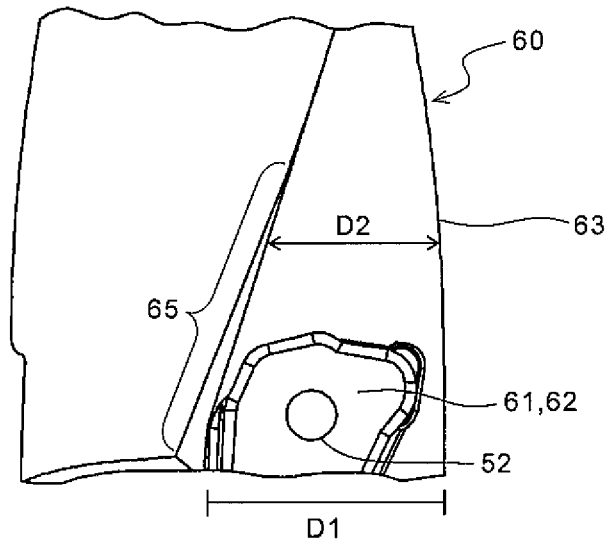
FIGS. 10(a) and 10(b) are schematic explanatory drawings showing a wall face according to other embodiment of the present invention.
Figure 10:
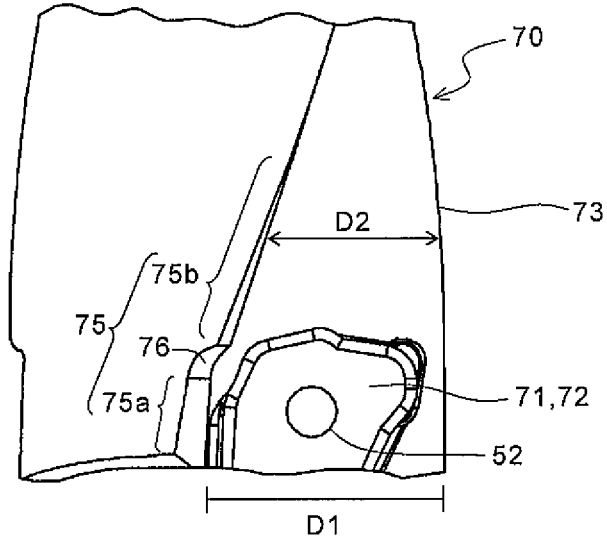

The wall face 40 according to the foregoing embodiment can be formed in the shapes, for example, as shown in FIGS. 10(a) and 10(b). The wall face 65 shown in FIG. 10(a) is similar to the wall face 40 except that unlike the wall face 40, it does not have the first face 40a and the second face 40b each having the specific angle. That is, the wall face 65 is also inclined so as to approach a first insert pocket side outer peripheral face 63 from the tip end of a holder 60 toward the basal end thereof when viewed from a direction substantially vertical to a constraining seat face 62 of a first insert pocket 61.

A wall face 75 shown in FIG. 10(b) is similar to the wall face 40 except that a first face 75a and a second face 75b are connected to each other through a curved face 76. That is, the wall face 75 is also inclined so as to approach a first insert pocket side outer peripheral face 73 from the tip end of a holder 70 toward the basal end thereof when viewed from a direction substantially vertical to a constraining seat face 72 of a first insert pocket 71. Other arrangements are similar to those of the drill 30 according to the foregoing embodiment.

The invention claimed is:

1. A holder, comprising:
a first insert pocket and a second insert pocket to which drill inserts are respectively attached are formed at a tip end side thereof, wherein
the first insert pocket is located closer to a central axis than the second insert pocket, and
an axial rake of the first insert pocket is larger than an axial rake of the second insert pocket
the first insert pocket comprises a constraining seat face which is configured to contact a lower face of one of the drill inserts attached to the first insert pocket, and a constraining side face which intersects with the constraining seat face on a side of the central axis of the holder and contacts with a side face of the one of the drill inserts,
the holder further comprises a wall face which extends in substantially the same direction as the constraining side face and is connected to a tip end face thereof and an outer peripheral face thereof located at a side of the second insert pocket, and
D1 and D2 have the following relationship: D1>D2 where D1 is a distance between the wall face in the tip end side of the holder and a first insert pocket side outer peripheral face of the holder, and D2 is a distance between the wall face in the basal end side of the holder and the first insert pocket side outer peripheral face of the holder, when viewed from a direction substantially vertical to the constraining seat face.

2. The holder according to claim 1, wherein both of the axial rake of the first insert pocket and the axial rake of the second insert pocket are positive.

3. The holder according to claim 1, wherein
the wall face is inclined so as to approach the outer peripheral face of the holder located at the side of the first insert pocket from the tip end of the holder toward the basal end thereof, when viewed from the direction substantially vertical to the constraining seat face, and
the wall face comprises a first face located at the tip end side of the holder and a second face located closer to the basal end side of the holder than the first face, and
γ1 and γ2 have the following relationship: γ1<γ2 where γ1 is an inclination angle of the first face to the central axis of the holder, and γ2 is an inclination angle of the second face to the central axis of the holder.

4. The holder according to claim 3, wherein
an intersection portion between the first face and the second face is located closer to the tip end side of the holder than an end of the constraining seat face located at the basal end side of the holder, when viewed from the direction substantially vertical to the constraining seat face.

5. The holder according to claim 1, further comprising a coolant hole which penetrates from the basal end side to the tip end side and opens in an outer peripheral face on the tip end side, wherein
the coolant hole comprises a first opening located in the vicinity of the first insert pocket and a second opening located in the vicinity of the second insert pocket, the first opening being located closer to the basal end side of the holder than the second opening.

6. A drill, comprising:
the holder according to claim 1;
a first drill insert which comprises a first cutting edge, and is attached to the first insert pocket of the holder so that the first cutting edge protrudes from a tip end face of the holder; and
a second drill insert which comprises a second cutting edge, and is attached to the second insert pocket of the holder so that the second cutting edge protrudes from the tip end face of the holder.

7. The drill according to claim 6, wherein
each of the first drill insert and the second drill insert comprises an upper face, a lower face corresponding to the upper face, a first breaker groove formed along the first cutting edge and a second breaker groove formed along the second cutting edge in the upper face, and an apex portion formed continuously with an inward portion of the first breaker groove and an inward portion of the second breaker groove,
a distance between the apex portion and the first cutting edge is substantially equal to a distance between the apex portion and the second cutting edge in a direction vertical to the lower face, and
a distance between the apex portion and the first cutting edge is smaller than a distance between the apex portion and the second cutting edge in a direction vertical to the central axis of the holder.

8. The drill according to claim 6, wherein
at least one of the first drill insert and the second drill insert comprises a land face formed along the first cutting edge or the second cutting edge, the land face being parallel to the central axis of the holder.

9. The drill according to claim 6, wherein
the first drill insert and the second drill insert each comprises a side face along the first cutting edge and a side face along the second cutting edge, and
a clearance angle of the side face along the first cutting edge of the first drill insert is equal to a clearance angle of the side face along the second cutting edge of the second drill insert.

10. A method of cutting a work material, comprising:
rotating either one of the drill according to claim 6 and a work material;
bringing the first cutting edge and the second cutting edge of the drill closer to the work material;
cutting the work material by bringing the first cutting edge and the second cutting edge of the drill into contact with the surface of the work material; and
separating the first cutting edge and the second cutting edge from the work material.

* * * * *